UNITED STATES PATENT OFFICE.

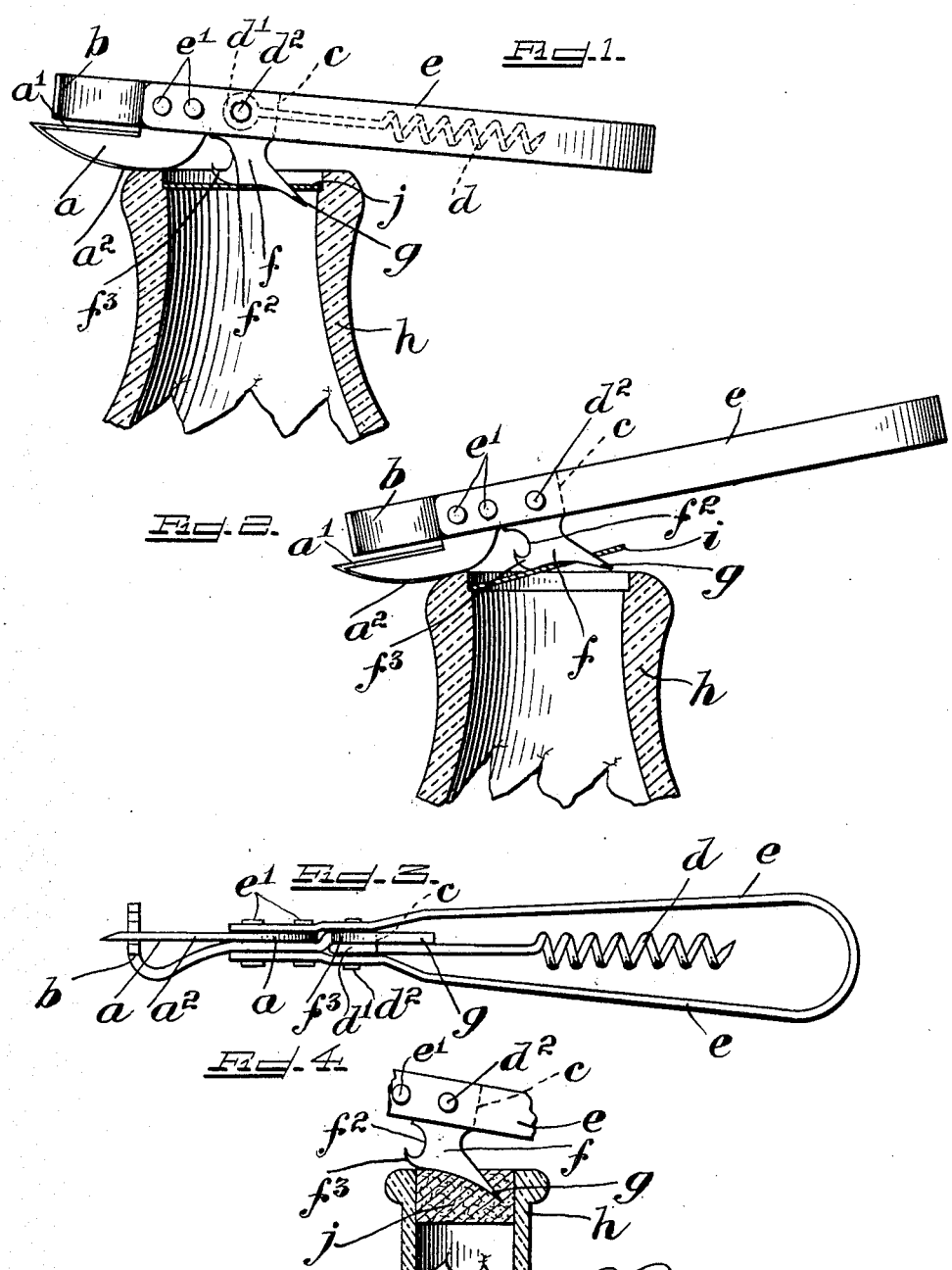

BENJAMIN F. BIRD, OF KINGSTON, NEW YORK.

COMBINATION-TOOL.

No. 913,191.   Specification of Letters Patent.   Patented Feb. 23, 1909.

Application filed April 2, 1908. Serial No. 424,685.

*To all whom it may concern:*

Be it known that I, BENJAMIN F. BIRD, a citizen of the United States, residing at Kingston, in the county of Ulster and State of New York, have invented certain new and useful Improvements in Combination-Tools, of which the following is a specification, reference being had therein to the accompanying drawing, which forms a part thereof.

My invention relates to combination tools and more particularly to a type therein especially adapted for kitchen or household use.

The main object of the invention is to provide a combination tool embodying therein a plurality of implements, each of which will be adapted for a special use, and, in addition thereto, will coöperate with some other implement, when it is in use, for the purpose of increasing the efficiency of said other tool.

A further object is to provide in a single tool, a can-opener, a bottle cap remover, a milk-jar cap remover, and a cork screw, which parts will be compactly and neatly associated, so as not to interfere with the use of any one implement, and at the same time have each implement enter into the operation of another.

A still further object is to provide a combination tool embodying therein the shearing blade of a can-opener, and back of same a rearwardly and downwardly projected spur having a sharpened point adapted to pass through a card-board cap for a milk bottle, or into a large flat cork, such as is commonly used in pickle, olive, mustard and similar bottles or jars, and secure a good hold thereon, whereby the bottom of the said shearing blade will be brought into engagement with the neck of the bottle so as to serve as a fulcrum for securing the purchase necessary to readily remove the cap or extract the cork.

A still further object is to provide a tool of this character wherein a suitable stop will be provided adjacent to the spur to prevent the said spur being forced too far into the cap or cork with a tendency to force same into the jar or bottle.

A still further object is to provide a tool wherein this stop, in addition to having this function, will constitute a rolling fulcrum just back of the spur and act as a bottle cap remover.

A still further object is to provide a combined spur and bottle cap remover wherein the plate forming these parts will be integral with each other and with the fulcrum head of the can opener, and one rivet securing same in place will act as a pivot for a corkscrew, the eye of which will flex the said plate and position it in alinement with the shearing blade, thus not only securing a proper adjustment of parts, but subjecting said eye to a constant spring pressure which will prevent said cork-screw being accidentally opened. And a still further object is to provide a combination tool which will be simple in its design and mode of operation, which will embody therein a number of useful implements constantly required for use in the kitchen and which can be economically produced.

The invention consists primarily in a combination tool as a new article of manufacture, embodying therein a shearing blade, a fulcrum head above and extending across same, a handle for said parts, and a spur carried by said handle adjacent to and rearwardly of said blade, whereby said blade serves as a fulcrum for the operation of said spur; and in such other novel features of construction and combination of parts as are hereinafter set forth and described and more particularly pointed out in the claims hereto appended.

Referring to the drawings,—Figure 1 is a side elevation of a combination tool embodying my invention, showing the spur inserted in the card-board closure cap of a milk-jar; Fig. 2 is a similar view showing the position assumed by the various parts in removing the cap. Fig. 3 is a bottom view of the tool; and Fig. 4 is a view illustrating the use of the bottle cap removing hook as a short fulcrum for a narrow necked bottle or jar.

Like letters refer to like parts throughout the several views.

In the embodiment of my invention shown in the drawings, $a$ indicates a shearing blade, having a straight sharpened edge $a'$ and a rounded lower edge $a^2$, a well-known type of can-opener blade. Extending perpendicularly to, above and across, the said blade, is a fulcrum head $b$ consisting of a single strip of metal, formed to the desired shape. The shank $c$ of said fulcrum head is utilized not only as a means for positioning the fulcrum head properly relative to the blade $a$, but also as a retaining spring for the cork-screw *d*. The blade *a* and fulcrum head *b* are secured to a handle *c* by means of the rivets *e'*, *e'*, said handle being composed of a continuous strip of metal formed into a looped portion to afford a suitable grip for the handle, the ends of said loop being drawn together and closed upon the said shank and the said blade by the said rivets. The shank *c* passes along one side of the blade *a* and has its end projected rearwardly thereof, said projecting end being flexed back of said blade to provide space for the eye *d'* of the cork-screw *d* between it and one side of said handle. A rivet $d^2$ passing through said handle, said shank and said eyelet not only serves as a pivot for said cork-screw, but also binds these parts together to an extent to give a permanent tension to the projecting end of the shank *c* in a manner to place the eye *d'* under a constant yielding pressure which will prevent a free movement of said cork-screw about the rivet $d^2$.

Carried by the handle *e* is a plate *f*, preferably made integral with the shank *c*. This plate is positioned adjacent to and rearwardly of the blade *a* and alined therewith so that the said blade *a* will constitute a fulcrum for both of the tools formed on or carried by said plate. When said plate *f* is made integrally with the shank *c*, the flexing of said shank *c* will serve to bring about the desired positioning, or alinement, of the plate and blade. The forward edge of the plate *f* is recessed at $f^2$ and curved upwardly to form a hook $f^3$ adapted to engage and remove the ordinary metallic closure cap for bottles. The recessed portion $f^2$ not only provides the clearance required in the operation of the tool in removing the bottle cap, but, if desired, said space may be utilized for receiving, and gripping by a twisting action, wooden skewers in roasts. The hook $f^3$ projects towards the blade *a* and the under edge of said blade forms a rolling fulcrum for said hook. The other edge of the plate *f* is formed into a spur *g* projected rearwardly and downwardly relative to said blade *a* and the hook $f^3$. This spur is brought to a point so as to readily penetrate a card-board bottle cap or a large cork such as is ordinarily used in condiment bottles. It is positioned adjacent to the hook $f^3$ not only as a convenience in manufacturing, but to utilize the under curved edge of said hook as a secondary, short, rolling fulcrum for use on narrow necked bottles of the character above referred to. The plate *f*, being pendent from the handle *e*, distances the spur *g* sufficiently from said handle to give a clear field for the operation of the shearing blade *a*, or the cork-screw *d*, without likelihood of tearing the hand thereon, or on the hook $f^3$ carried by said plate. The hook $f^3$ not only serves as a short fulcrum for the operation of the spur *g*, but also acts as a stop, which by engagement with the cap or cork, when the blade *a* is used as the fulcrum, will prevent the spur from entering the cap too far, thus causing the lifting action of the handle about said block *a* to raise one side of the cap or cork first, and hold the cap, or cork, firmly between the top surface of said spur and the bottom surface of said hook, particularly when the spur is used for removing a card-board cap.

While I prefer to make the plate *f* integral with the fulcrum head *b*, it may be made of a separate piece, if desired.

In operation, the bottom of the blade *a* is placed upon the neck of the bottle or jar, when the mouth of the bottle or jar *h* is sufficiently wide to position the spur above or upon the top of the cap or cork indicated at *j*, and the entire tool moved toward the cap with a slight downward pressure so as to cause the spur *g* to penetrate the said cap or cork *j*. The curved edge $a^2$ of the blade *a* will permit a simultaneous longitudinal and rocking movement of the blade relative to the neck of the bottle *h* to permit the corresponding movements of the spur *g* necessary to cause it to pass through and under the said cap or cork *j*. When the spur *g* reaches the limit of the movement required to get a good purchase on the cap or cork *j*, the hook $f^3$ contacts the said cap or cork and it is so held between these two parts that a direct upward pull, or a vertical movement of the handle *e* about the fulcrum afforded by the blade *a* cannot extract the spur from the cap or cork without breaking or tearing same, unless the cap buckles upwardly rearwardly of the spur. Its engagement with the hook $f^3$ would prevent such buckling, however, and thus cause any movement of the said spur except with the cap or cork.

The rolling fulcrum afforded by the curved edge $a^2$ of the blade *a* has the advantage of following the bottle top without having a tendency to slip forward in a manner to tend to disengage the spur *g* from the cap *j*.

In case the width of the neck of the jar or bottle *h* is not sufficiently great to permit the use of the blade *a* as a fulcrum, the hook $f^3$ may be rested upon the neck of the bottle, as shown in Fig. 4, and used in lieu of said blade *a*. This provision of alternate fulcrums adapts the spur for use with a wide range of bottles and jars, and preserves all the functions and the desirable points in the mode of operation of the spur *g*. The curved bottom of the hook $f^3$ not only forms a rolling fulcrum when said hook is so used, but also brings the hook to that point which is required to make it operative in a satisfactory manner as a cap remover for metallic bottle caps. The blade *a* also acts as a rolling fulcrum for the hook $f^3$, permitting said hook to be inserted at any angle which may be necessary to secure a good hold on the cap, and insuring a long leverage in removing the cap, and freeing the edge thereof from strains.

By forming the hook $f^3$ and the spur $g$ upon a pendent plate rearwardly of and adjacent to the shearing blade $a$, I not only position these parts with relation to their mode of operation in conjunction with said blade, but with relation to the handle $e$ in a manner to permit the cork-screw $d$ to be turned away from said handle toward the fulcrum-head $b$, thus leaving the handle adjacent to the shank of said cork-screw free from obstructions which would tend to interfere with the use thereof.

It will be observed that while the uses of the various implements entering into the tool are entirely distinct and apart, as to each other, so as to combine in a tool a number of dissimilar implements useful about the kitchen, these tools are so associated and combined as to cause one or more to enter into, and aid in, the operation of the other.

It is not my intention to limit the invention to the precise details of construction shown in the accompanying drawings, it being apparent that such may be varied without departing from the spirit and scope of the invention.

Having described the invention, what I claim as new and desire to have protected by Letters-Patent, is:—

1. As a new article of manufacture, a combination tool comprising a shearing blade, a fulcrum-head, above and extending across the same, a handle, and a spur carried by said handle adjacent to and rearwardly of said blade, whereby said blade serves as a fulcrum for the operation of said spur.

2. As a new article of manufacture, a combination tool embodying a shearing blade, a fulcrum-head, above and extending across the same, a handle, a spur carried by said handle to and rearwardly of said blade, and a hook carried by said handle and disposed between said spur and said blade, whereby said blade serves as a fulcrum for the operation of said spur and said hook, and said hook serves as a short fulcrum, for said spur.

3. As a new article of manufacture, a combination tool comprising a shearing blade, a fulcrum-head, above and extending across same, a handle, and a plate pendent upon said handle rearwardly of said blade, the edge thereof toward said blade being formed into a hook and the edge thereof away from said blade being formed into a spur projecting rearwardly and downwardly relative to said hook, whereby said blade forms a fulcrum common to said hook and said spur and said hook forms a short fulcrum for said spur.

4. As a new article of manufacture, a combination tool comprising a shearing blade, a fulcrum-head, above and extending across same, a shank integral therewith, a pendent plate integral with said shank, and a handle, said plate being disposed rearwardly of said blade, the edge thereof toward said blade being formed into a hook and the edge thereof away from said blade being formed into a spur projecting rearwardly and downwardly relative to said hook, whereby said blade forms a fulcrum common to said hook and said spur and said hook forms a short fulcrum for said spur.

5. As a new article of manufacture, a combination tool comprising a shearing blade, a fulcrum-head, above and extending across the same, a handle, and a spur rearwardly of said blade and said fulcrum-head projecting downwardly and away from said handle.

6. As a new article of manufacture, a combination tool comprising a shearing blade, a fulcrum-head, above and extending across same, a resilient sheet metal shank for said fulcrum-head extending parallel to and projecting beyond said shearing blade, an integral plate pendent from said shank, said plate having a spur and a hook formed thereon, a sheet metal handle formed into a central loop, rivets securing the ends of said handle to said blade and said shank, a cork-screw having an eye disposed between the projecting end of said shank and one end of said handle and a rivet passing through the ends of said handle, the projecting end of said shank and said eyelet whereby the projecting end of said shank is tensioned upon said eyelet.

In witness whereof, I have hereunto affixed my signature this 7th day of March, 1908, in the presence of two witnesses.

BENJAMIN F. BIRD. [L. S.]

Witnesses:
  SCHUYLER C. SCHULTZ,
  A. J. BURNS.